United States Patent [19]

Lebeau

[11] Patent Number: 4,844,576

[45] Date of Patent: Jul. 4, 1989

[54] LIGHT DIFFUSER

[75] Inventor: Christopher J. Lebeau, Tempe, Ariz.

[73] Assignee: Motorola Inc., Schaumburg, Ill.

[21] Appl. No.: 138,264

[22] Filed: Dec. 28, 1987

[51] Int. Cl.$^4$ ................................................ G02B 6/04
[52] U.S. Cl. ............................... 350/96.24; 350/96.10;
350/96.28; 350/321; 350/431
[58] Field of Search ............... 350/96.10, 96.15, 96.26,
350/96.27, 96.28, 96.30, 126, 321, H31

[56] References Cited

U.S. PATENT DOCUMENTS

| | | | |
|---|---|---|---|
| 3,922,073 | 11/1975 | Schwartz | 350/319 |
| 4,422,719 | 12/1983 | Orcutt | 350/96.30 |
| 4,466,697 | 8/1984 | Daniel | 350/96.10 X |
| 4,648,690 | 3/1987 | Ohe | 350/321 |
| 4,729,067 | 3/1988 | Ohe | 350/321 X |
| 4,733,929 | 3/1988 | Brown | 350/96.29 X |

Primary Examiner—William L. Sikes
Assistant Examiner—Phan Heartney
Attorney, Agent, or Firm—Harry A. Wolin; Raymond J. Warren

[57] ABSTRACT

A light diffuser is described having a body with an opening therethrough defined by an inner wall. Light conducting paths are disposed through the body and couple to the opening. The inner wall is sloped at an angle to reflect the light onto a workpiece. The size of the opening and the height of the diffuser above the workpiece determine the angle of the inner wall.

12 Claims, 2 Drawing Sheets

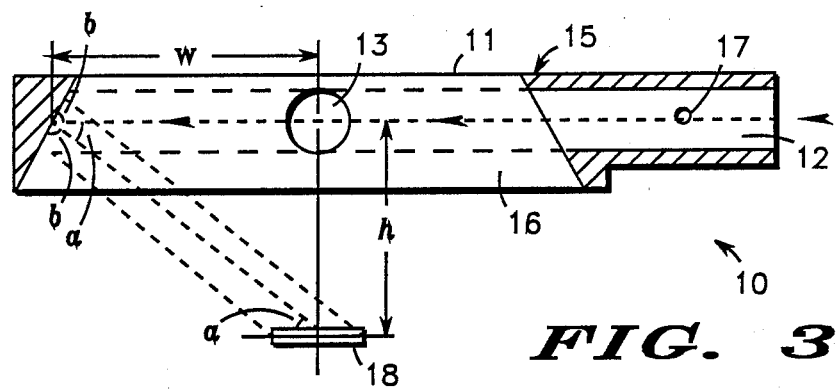
FIG. 3
FIG. 4
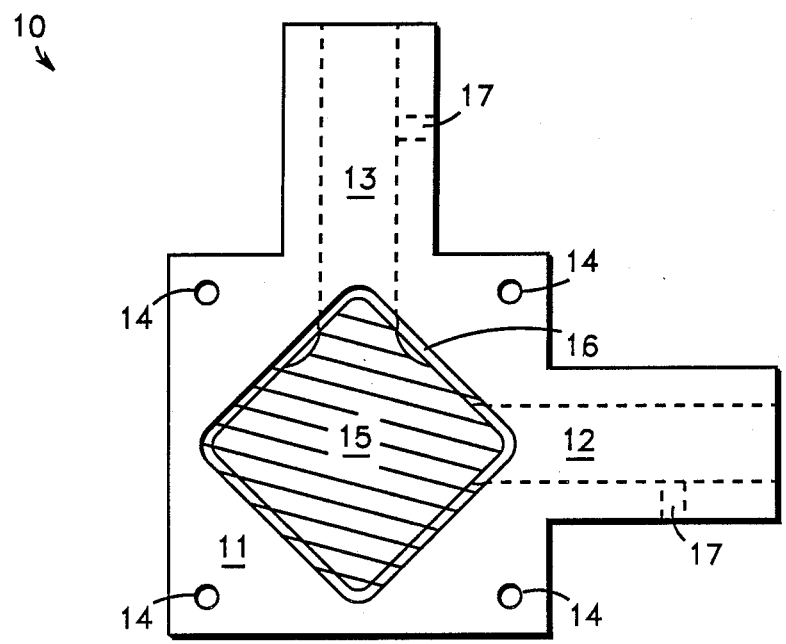
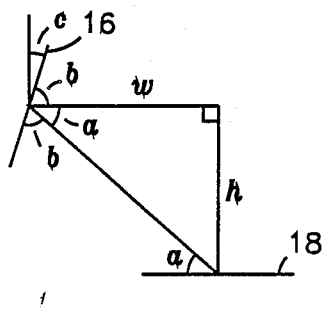
FIG. 5

LIGHT DIFFUSER

BACKGROUND OF THE INVENTION

The present invention relates, in general, to light diffusers and, more particularly, to light diffusers for use in semiconductor manufacturing equipment.

In general, there are two methods of illumination used in semiconductor manufacturing equipment, a directional light or a ring type fluorescent light. The preferable type of lighting will provide light from several directions. This is important from the standpoint that, without this type of lighting, shadows will develop that can mask many of the minute details of the semiconductor. This problem is more critical for automated processing which uses computer analysis of surface features.

While the ring type fluorescent light would provide the preferable type of lighting, the size of such lights make it impractical for these to be used in the small places required. The fluorescent lights would either inhibit access to the semiconductor, by probes or the like, or the items requiring access to the semiconductor would cause shadows.

This leaves the use of directional type lighting. While directional lighting is smaller and able to fit in the limited space available, it will not provide the uniform lighting required. In addition, the problems of equipment blocking the light while requiring access to the semiconductor are more pronounced.

Accordingly, it is an object of the present invention to provide a light diffuser that will overcome the above deficiencies.

A further object of the present invention is to provide a light diffuser that is compact.

Another object of the present invention is to provide a light diffuser that provides uniform lighting of a semiconductor.

Still another object of the present invention is to provide a light diffuser that is compatible with existing equipment.

The above and other objects and advantages of the present invention are provided by the light diffuser described herein.

SUMMARY OF THE INVENTION

A particular embodiment of the present invention consists of a light diffuser having a body with an opening therethrough defined by an inner wall. Light conducting means are disposed through the body and couple to the opening. The inner wall is sloped at an angle to reflect the light onto a workpiece. The size of the opening and the height of the diffuser above the workpiece determine the angle of the inner wall.

BRIEF DESCRIPTION OF THE DRAWINGS

FIG. 3 is a cross sectional view of the light diffuser of FIG. 1 illustrating the diffusion of light;

FIG. 4 is the bottom view of FIG. 2 illustrating the diffusion of light; and

FIG. 5 is a geometric representation of the reflection of light onto a workpiece by the light diffuser of FIG. 1.

DETAILED DESCRIPTION OF THE DRAWINGS

Figure 1:
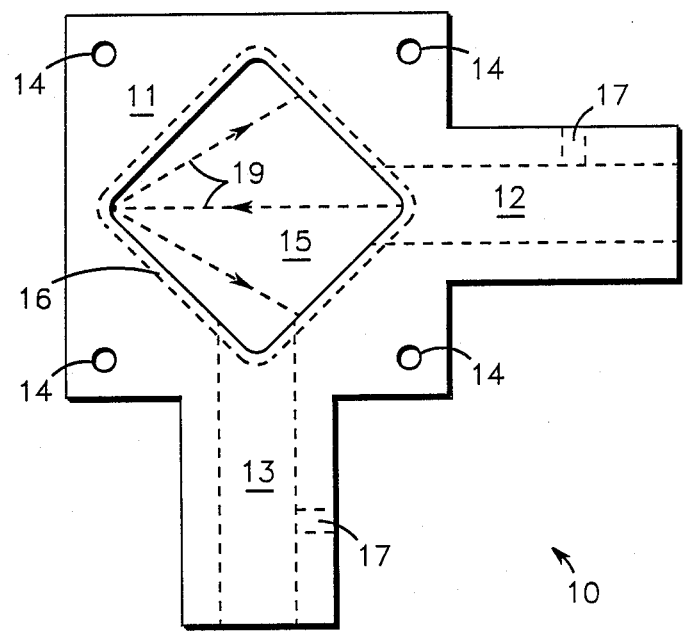
FIG. 1 is a top view of a light diffuser embodying the present invention.
Figure 2:
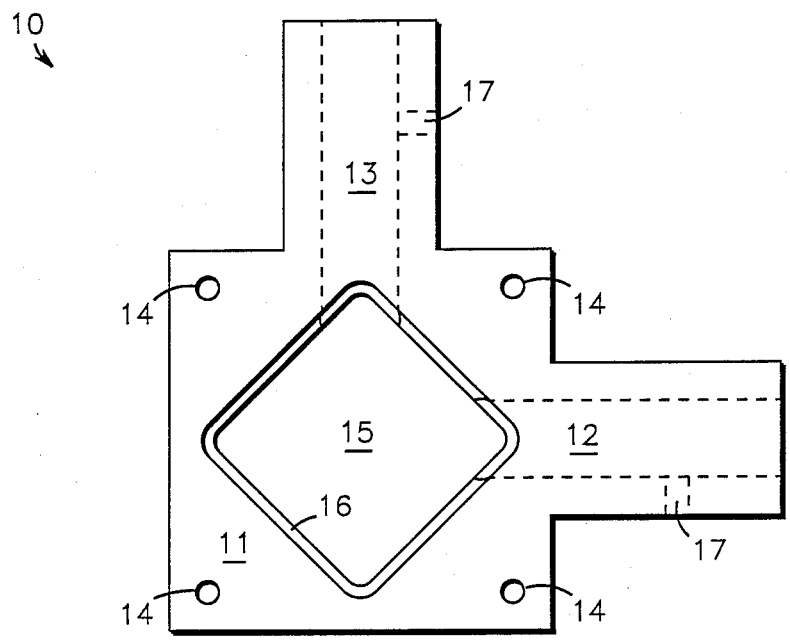
FIG. 2 is a bottom view of the light diffuser of FIG. 1.

Referring to FIGS. 1-4, a light diffuser, generally designated 10, embodying the present invention is illustrated. The main components of light diffuser 10 include a body 11 and first and second light conductor means 12 and 13. A plurality of holes 14 are provided for the mounting of diffuser 10 to various types of semiconductor manufacturing equipment.

An opening 15 is formed in body 11. Opening 15 is defined by an inner wall 16 of body 11. Wall 16 is generally in the shape of a square with rounded corners. However, it should be noted that other shapes, such as a circular shape, may be used. The rounded corners allow the light to be reflected from the corners to the side walls. This reflection is partly represented by dashed lines 19. The surface of wall 16 is a reflective surface. This reflective surface can be provided by either polishing, if body 11 is made from a metal (such as aluminum or the like), or coating the surface of wall 16 with a reflective material.

In operation, a light source, such as a fiber optic bundle, is inserted in first and second light conductor means 12 and 13. These fibers can be held in place by set screws disposed in openings 17. The light will then travel out through light conductor means 12 and 13 into opening 15. As shown in FIG. 4, the light exits from conductor 13 into opening 15 and diffuses approximately accordingly to the cross hatched pattern shown. Because the light entering opening 15 is a controlled diffuse light, it will cover almost the entire area. By providing an additional conductor 12, the small areas not covered by light from conductor 13 can be illuminated.

Wall 16 of body 11 is provided with an angle in order to reflect the light entering opening 15 onto a workpiece 18, such as the semiconductor dice shown in FIG. 3. The angle of wall 16 is determined by the size of opening 15 and the height of diffuser 10 above workpiece 18. As shown in FIG. 3, the height (h) of body 11 above workpiece 18 is taken from the surface of workpiece 18 to the center of light conductors 12 and 13. One-half the width of opening 15 (w) is determined by taking a parallel line from the center of opening 15 to one corner of wall 16. The point on wall 16 is selected to be the same height as the center of conductors 12 or 13. These dimensions are transposed onto FIG. 5 which shows wall 16 and workpiece 18. Angle C of wall 16 can then be determined by solving the following trigonometric equations. Angle A can be determined by solving equation (1):

$$\tan(A) = h/w. \tag{1}$$

Often the h and/or w dimensions are determined by the particular application and the space available for diffuser 11. Once angle A has been determined angle B can be determined by the equation:

$$180° = A + 2B. \tag{2}$$

Finally, the slope of wall 16, angle C, can be solved for using equation (3)

$$90° = B + C. \tag{3}$$

It should be noted that if the size of workpiece 18 changes substantially, larger diameter light conductors 12 and 13 may be required. However, with the diffusion of light, the diameter of the light conductors 12 and 13 can often be smaller than workpiece 18.

In a shorter form, by combining equations (1), (2), and (3), angle C can be determined using equation (4):

$$\mathrm{Tan}(2C) = h/w \quad (4)$$

As noted previously, other shapes aside from the square design used in FIG. 1 may be utilized. One other shape tested was a circular shaped opening. This opening worked well but required more than two light conducting means. The minimum the circular shape required was three light conducting means.

Thus, a light diffuser has been illustrated that: is compact; will provide uniform controlled lighting of the workpiece; and is compatible with existing manufacturing equipment.

Thus, after reviewing the above specification, it will be apparent to one of skill in the art that there has been provided a device that fully satisfies the objects aims and advantages set forth above.

While the invention has been described in conjunction with specific embodiments thereof, it will be evident that many alterations, modifications, and variations will be apparent to those skilled in the art in light of the foregoing description. Accordingly, it is intended to embrace all such alterations, modifications, and variations in the appended claims.

I claim:

1. A light diffuser comprising:
   a body having an inner wall defining an opening therethrough, said inner wall having a slope defined by an angle, said angle being defined by the equation, $$\mathrm{Tan}(2C) = h/w$$

where C is the angle of the slope of said inner wall, h is the height of said body above a workpiece being illuminated, and w is the distance from a center of the opening defined by said body to said inner wall;
   light conducting means for conducting light to the opening defined by said inner wall of said body; and
   a fiber optic bundle disposed in said light conducting means.

2. The light diffuser of claim 1 wherein the opening defined by said inner wall of said body is shaped in a square having rounded corners.

3. The light diffuser of claim 2 wherein said light conducting means are coupled to said rounded corners of said inner wall.

4. A light diffuser used in illuminating semiconductor devices comprising:
   a body having an inner wall defining a square shaped opening having rounded corners, said inner wall having a slope defined by an angle, said angle being defined by the equation, $$\mathrm{Tan}(2C) = h/w$$

where C is the angle of the slope of said inner wall, h is the height of said body above said semiconductor device being illuminated, and w is the distance from a center of the opening defined by said body to said inner wall;
   light conducting means for conducting light to the opening defined by said inner wall of said body, said light conducting means being coupled to said rounded corners of said inner wall; and
   a fiber optic bundle disposed in said light conducting means.

5. A light diffuser comprising:
   a body having an opening extending completely therethrough, said opening being defined by an inner wall having a reflective surface; and
   at least one enclosed light conducting path leading to said opening, said at least one enclosed light conducting path to be coupled to a light source.

6. The light diffuser of claim 5 wherein the opening is in the configuration of a square having rounded corners.

7. The light diffuser of claim 6 wherein two enclosed light conducting paths lead into the opening at adjacent corners.

8. The light diffuser of claim 7 wherein the inner wall has a slope defined by an angle wherein the angle is defined by the equation:

$$\mathrm{Tan}(2C) = h/w$$

where C is the angle of the slope of said inner wall, h is the height of said body above a workpiece being illuminated, and w is the distance from the center of the opening.

9. A light diffuser comprising:
   a body having an opening therein, said opening being defined by an inner wall having a reflective surface; and
   at least one light conducting path coupled to a fiber optic bundle and leading to said opening.

10. The light diffuser of claim 9 wherein the opening is in the configuration of a square having rounded corners.

11. The light diffuser of claim 10 wherein two light conducting paths lead into the opening at adjacent corners.

12. The light diffuser of claim 11 wherein the inner wall has a slope defined by an angle wherein the angle is defined by the equation:

$$\mathrm{Tan}(2C) = h/w$$

where C is the angle of the slope of said inner wall, h is the height of said body above a workpiece being illuminated, and w is the distance from the center of the opening.

* * * * *